US008660075B2

(12) United States Patent
Ghanwani et al.

(10) Patent No.: US 8,660,075 B2
(45) Date of Patent: Feb. 25, 2014

(54) CONGESTION NOTIFICATION IN PRIVATE VLANS

(75) Inventors: Anoop Ghanwani, Rocklin, CA (US); Shunjia Yu, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 208 days.

(21) Appl. No.: 13/155,159

(22) Filed: Jun. 7, 2011

(65) Prior Publication Data

US 2012/0176893 A1 Jul. 12, 2012

Related U.S. Application Data

(60) Provisional application No. 61/431,317, filed on Jan. 10, 2011.

(51) Int. Cl.
*H04L 1/00* (2006.01)
*H04L 12/26* (2006.01)
*H04L 12/28* (2006.01)
*H04L 12/56* (2011.01)

(52) U.S. Cl.
USPC ........ 370/329; 370/230.1; 370/231; 370/235; 370/392

(58) Field of Classification Search
USPC .................. 370/229–231, 235, 328, 329, 392
See application file for complete search history.

(56) References Cited

U.S. PATENT DOCUMENTS

| 7,200,145 | B1 | 4/2007 | Edsall |
| 7,606,939 | B1 | 10/2009 | Finn |
| 7,710,959 | B2 | 5/2010 | Ramasamy |
| 7,808,992 | B2 | 10/2010 | Homchaudhuri |
| 2008/0031261 | A1 | 2/2008 | Addeo |

OTHER PUBLICATIONS

"IEEE Standard for Local and Metropolitan Area Networks—Virtual Bridged Local Area Networks Amendment 13: Congestion Notification", IEEE Computer Society, IEEE std 802.1Qua-2010, Apr. 23, 2010.
Homchaudhuri, S. et al., "Cisco Systems Private VLANs: Scalable Security in a Multi-Client Environment", pp. 1-13, Feb. 2010.

*Primary Examiner* — Ronald Abelson
(74) *Attorney, Agent, or Firm* — Shun Yao; Park, Vaughan, Fleming & Dowler LLP

(57) ABSTRACT

One embodiment of the present invention provides a switch. During operation, in a network with a private VLAN configuration, the switch allows a congestion notification message with an isolated virtual local area network identifier (VLAN ID) to be forwarded via an isolated VLAN port.

19 Claims, 4 Drawing Sheets

CONGESTION NOTIFICATION IN PRIVATE VLANS

RELATED APPLICATION

This application claims the benefit of U.S. Provisional Application No. 61/431,317, entitled "CONGESTION NOTIFICATION IN PRIVATE VLANS," by inventors Anoop Ghanwani and Shunjia Yu, filed 10 Jan. 2011.

BACKGROUND

1. Technical Field

This disclosure relates to computer networking More specifically, this disclosure relates to systems and techniques for delivering congestion notifications in a network involving a private virtual local area network (VLAN).

2. Related Art

In order to address security issues within a virtual local area network (VLAN) where hosts can establish direct layer 2 communication with one another, private VLAN technology has been implemented. Private VLANs partition a large VLAN broadcast domain into smaller sub-domains, including "isolated" sub-domain and "community" sub-domain, thereby facilitating layer 2 traffic isolation among VLAN customers. Each sub-domain is defined by a designation assigned to a group of switch ports.

Within a private VLAN domain, for a given port on a switch that couples to an endpoint (such as an end host), three separate port designations exist: isolated, community, and promiscuous. Each port designation has its own unique set of forwarding rules, which regulate how an endpoint coupled to a given switch port can communicate with other connected endpoints within the same private VLAN domain. A promiscuous port can communicate with all types of ports, including community and isolated ports; a community port can communicate with other community ports in the same community sub-domain and with promiscuous ports; and an isolated port can only communicate with a promiscuous port. An inter-switch link port is designated as a trunk port. A trunk port is typically presumed to be unaware of the private VLAN configuration and hence is not required to enforce the forwarding rules associated with the above designations.

The existence of private VLANs within a network imposes a challenge for congestion management. In particular, forwarding rules associated with an isolated sub-domain can prevent the flow of congestion notification messages (CNMs).

SUMMARY

One embodiment of the present invention provides a switch. During operation, the switch allows a frame with an isolated virtual local area network identifier (VLAN ID) to be forwarded via an isolated VLAN port.

In a variation on this embodiment, the switch enforces an egress filtering rule for the isolated VLAN port.

In a further variation, the egress filtering rule permits forwarding of frames with an isolated VLAN ID or primary VLAN ID.

In a variation on this embodiment, the switch enforces an egress access control list.

In a further variation, enforcing the egress access control list involves preventing a frame with an isolated VLAN ID and which is not a congestion notification frame from being forwarded via the isolated VLAN port.

In a further variation, enforcing the egress access control list involves examining an Ethertype field in the frame's header to determine whether the frame is a congestion notification message.

In a variation on this embodiment, the frame is an Ethernet frame.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present invention facilitate unblocked flow of congestion notification messages (CNMs) within a network that implements private virtual local area networks (VLANs). In private VLANs, a switch is prohibited from forwarding a frame with a VLAN ID corresponding to an isolated sub-domain out of an isolated port. Consequently, a CNM frame with a VLAN ID associated with an I-port cannot reach the source of congestion via an isolated port. To solve this problem, embodiments of the present invention allow CNM with isolated VLAN IDs to be forwarded via an I-port and use egress access control lists (eACLs) to enforce the egress VLAN filtering functions. Note that the existing IEEE 802.1Qau standard allows transmission of CNMs using the primary VLAN ID (as explained in the following section), however, in a network where a private VLAN is implemented across a provider bridge network, determining the primary VLAN is non-trivial. In addition, to allow CNMs to propagate, even in regular networks, the core switches would be required to maintain a VLAN ID to primary VLAN ID mapping table, which results in significant configuration overhead.

Private VLAN

Figure 1:
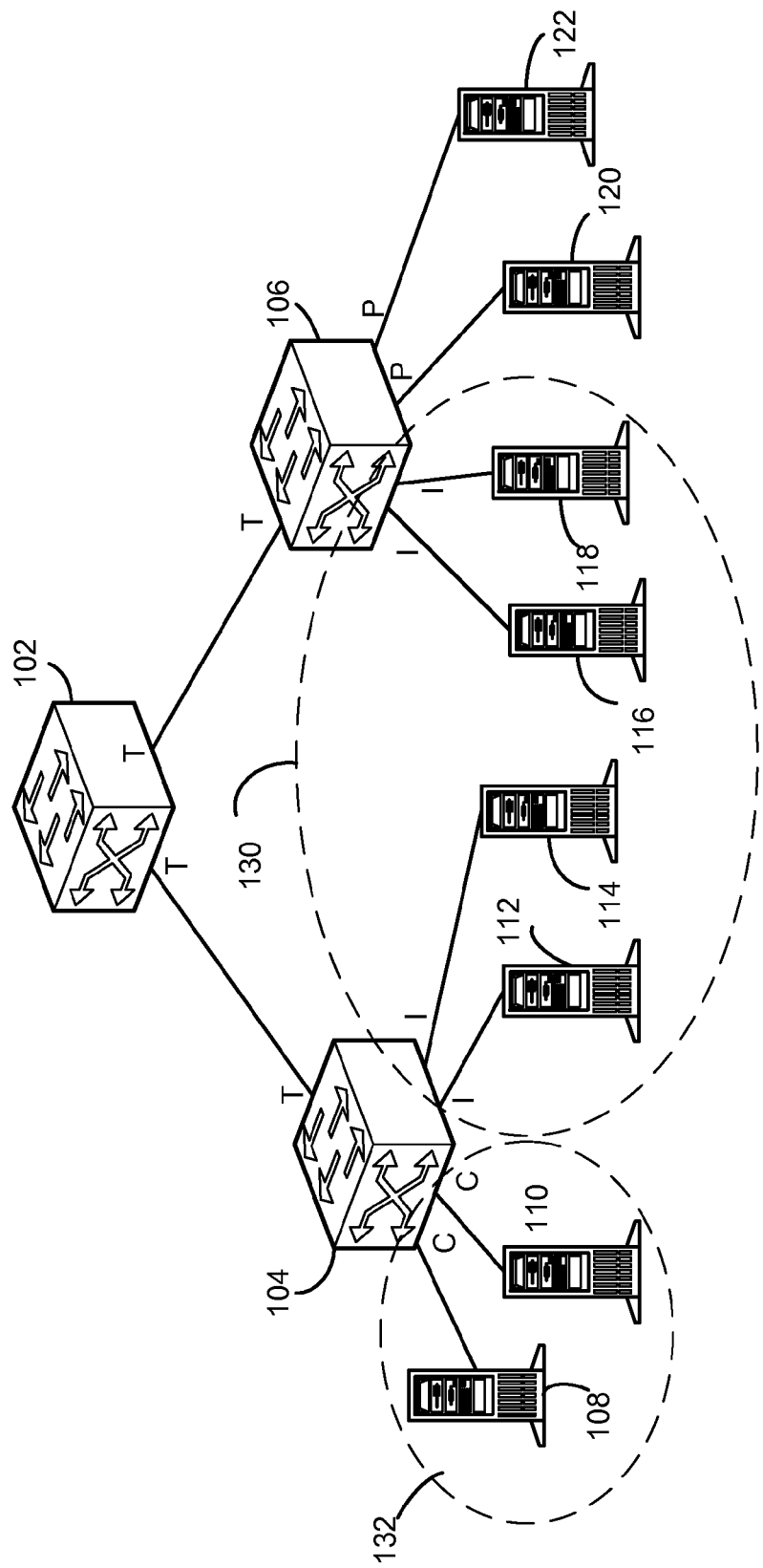
FIG. 1 illustrates an exemplary network with a private virtual local area network (VLAN) configuration.

FIG. 1 illustrates an exemplary private virtual local area network (VLAN). Network 100 includes a number of switches 102, 104, and 106, and a number of hosts 108, 110, 112, 114, 116, 118, 120, and 122. In FIG. 1, switch 102 is coupled to switches 104 and 106, hosts 108, 110, 112, and 114 are coupled to switch 104, and hosts 116, 118, 120, and 122 are coupled to switch 106. In general, private VLANs partition a regular VLAN domain into sub-domains, each of which includes a primary VLAN and one or more secondary VLANs. A primary VLAN is identified by a primary VLAN ID and corresponds to one or more promiscuous ports. All ports are allowed to transmit frames labeled with the primary VLAN ID, but only promiscuous ports can accept frames with the primary VLAN ID. A secondary VLAN can be either one of several community VLANs or an isolated VLAN, and is identified by corresponding secondary VLAN IDs.

There are two types of secondary VLANs: isolated VLANs and community VLANs. Ports within an isolated VLAN are designated as isolated ports, and can only communicate with a promiscuous port but not with each other using bridging. Ports within a community VLAN are designated as community ports and can communicate with each other within the same community VLAN as well as a promiscuous port, but not with ports in other communities or isolated ports using bridging. In FIG. 1, network 100 includes two secondary VLANs, namely isolated VLAN 130 and community VLAN 132.

As noted above, in private VLANs, switch ports are designated into three different types: promiscuous, isolated, and community. A promiscuous port (P-port) can receive traffic from any endpoint within the primary VLAN as well as any secondary VLAN (i.e., an isolated VLAN or a community VLAN). For example, in FIG. 1, the primary VLAN includes two P-ports (denoted as "P"), and hosts 120 and 122 are coupled to switch 106 via these P-ports, meaning that they can receive traffic from all other hosts within network 100.

An isolated port (I-port) is a switch port that belongs to an isolated secondary VLAN. In FIG. 1, isolated VLAN 130 includes four I-ports (denoted as "I"), two of which are located on switch 104, and the other two of which are located on switch 106. A private-VLAN-aware switch is required to block traffic sent to an I-port unless a frame has a VLAN ID corresponding to the primary VLAN (i.e., a VLAN ID corresponding to a P-port). Also, traffic received from an I-port is forwarded only to P-ports. Therefore, an endpoint coupled to an I-port can only communicate with endpoint(s) coupled to a P-port. Endpoints coupled to I-ports cannot communicate with each other. For example, in FIG. 1, hosts 116 and 118 are coupled to switch 106 via I-ports, and hosts 112 and 114 are coupled to switch 104 via I-ports. Consequently, hosts 112, 114, 116, and 118 can only communicate with hosts 120 and 122, but not with one another.

A community port (C-port) is a switch port that belongs to a community secondary VLAN. In FIG. 1, community VLAN 132 includes two C-ports on switch 104 (denoted as "C"). C-ports can communicate with other ports in the same community VLAN and with P-ports. These interfaces are isolated from the standpoint of bridging from all other interfaces in other communities, as well as from isolated ports. In FIG. 1, hosts 108 and 110 are coupled to switch 104 via C-ports in community VLAN 132. Consequently, hosts 108 and 110 can communicate with each other as well as hosts 120 and 122, but not with hosts 112, 114, 116, and 118.

In FIG. 1, switch 102 is coupled to switches 104 and 106 via inter-switch link ports, or trunk ports (T-ports, denoted as "T"). A switch is allowed to forward traffic from all ports, including isolated, community, and promiscuous ports, to a T-port. On the other hand, traffic from a T-port is supposed to be tagged with a VLAN ID that corresponds to either a primary VLAN (i.e., originated at a P-port), a community secondary VLAN (i.e., originated a C-port), or an isolated secondary VLAN (i.e., originated an I-port). Such traffic from a T-port is treated as though it originated from a promiscuous, community, or isolated port, based on a frame's VLAN ID. For example, if the traffic received from a T-port carries an isolated VLAN ID, it cannot be sent out via an I-port (because only frames with a primary VLAN ID can be sent out via an I-port). Such restrictions prevent devices coupled to the I-ports of different switches from communicating with each other.

The aforementioned rules governing traffic flow between different ports in private VLANs can be enforced using the ingress and egress VLAN filtering functions. For example, the ingress VLAN filtering (IVF) and egress VLAN filtering (EVF) rules for an I-port can be expressed as IVF={I}, EVF={P}. These rules require that an I-port is only allowed to (1) receive from an endpoint (ingress) frames with a VLAN ID that corresponds to the isolated secondary VLAN associated with the I-port, and (2) forward to an endpoint (egress) frames with a VLAN ID that corresponds to the primary VLAN associated with a promiscuous port.

The IVF and the EVF rules for a C-port can be expressed as IVF={C}, EVF={C,P}. These rules require that a C-port is only allowed to (1) receive from an endpoint (ingress) frames with a VLAN ID that corresponds to the community secondary VLAN associated with the C-port, and (2) forward to an endpoint (egress) frames with a VLAN ID that corresponds to the community secondary VLAN or the primary VLAN.

The IVF and EVF rules for a P-port are IVF={P}, EVF={I,C,P}. These rules require that a P-port is allowed to (1) receive from an endpoint (ingress) frames with a VLAN ID that corresponds to the primary VLAN, and (2) forward to an endpoint (egress) frames with a VLAN ID that corresponds to an isolated secondary VLAN, a community secondary VLAN, or the primary VLAN.

The IVF and EVF rules for a T-port are IVF={I,C,P}, EVF={I,C,P}. These rules mean that a T-port is allowed to receive and forward frames with a VLAN ID that corresponds to an isolated secondary VLAN, a community secondary VLAN, or a primary VLAN.

In this disclosure, an isolated secondary VLAN is identified by a corresponding VLAN ID, which can be referred to as an "isolated VLAN ID." Similarly, a community secondary VLAN is identified by a corresponding "community VLAN ID." The primary VLAN is identified by a "primary VLAN ID."

Although this disclosure is presented using examples based on Ethernet switches, embodiments of the present invention are not limited to Ethernet networks, or networks defined in a particular Open System Interconnection Reference Model (OSI reference model) layer. For example, embodiments of the present invention can be implemented in a transparent interconnection of lots of links (TRILL) network, a Fibre Channel (FC) network, a virtual cluster switched (VCS) network, or a network employing Ethernet fabrics. In addition, the term "switch" is used in a generic sense and does not limit embodiments of the present invention to only Ethernet switches. Other types of switches, bridges, routers, and forwarders can also be used.

The terms "frame" or "packet" refer to a group of bits that can be transported together across a network. Although the term "frame" usually refers to Ethernet frames, it should not be interpreted as limiting embodiments of the present invention to only layer-2 networks. "Frame" or "packet" can be replaced by other terminologies referring to a group of bits, such as "cell" or "datagram."

Congestion Notification in Private VLAN

IEEE standard 802.1Qau (available at http://standards-.ieee.org/about/get/802/802.1.html) describes a congestion notification (CN) mechanism that can detect and mitigate queue congestions for a selected class of traffic in VLANs. The CN mechanism provides a means for a bridge or switch to notify a source of congestion to allow the source to reduce the rate of a data flow that contributes to the congestion.

Figure 2:
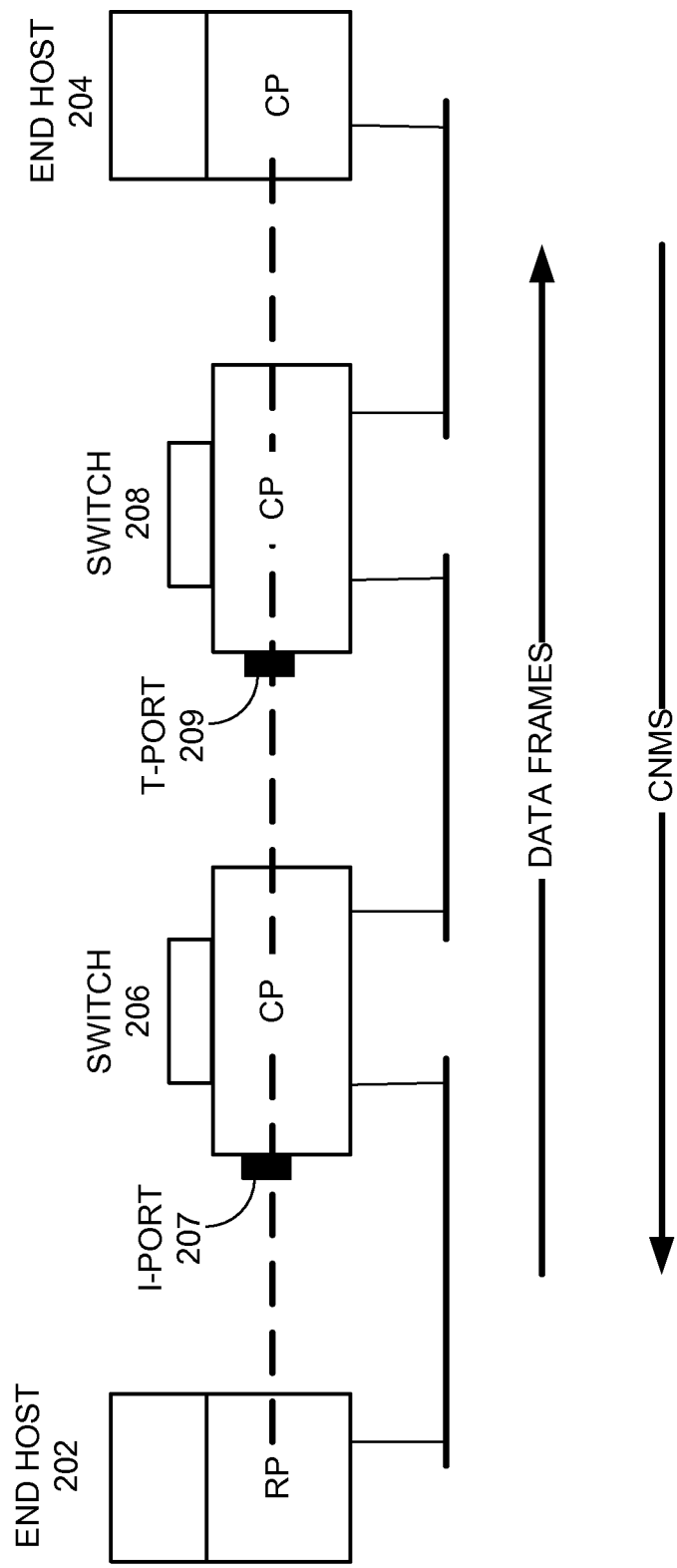
FIG. 2 illustrates an exemplary peer relationship between congestion points (CPs) and an RP (reaction point) in a VLAN bridged network.

When a switch detects congestion (for example by detecting the size of a transmission queue surpassing a threshold), the switch selects a frame from the congested queue and sends a CNM to the source of the selected frame based on the source address in the frame's header. In response to receiving the CNM, the source (also called a reaction point (RP)) can decreases its transmission rate. Note that the CNM frame is generated with the primary VLAN ID corresponding to the VLAN ID in selected frame, which is usually the same as the VLAN ID in the frame. The transmission of a CNM from a congestion point (CP) to an RP makes CP and RP peer entities. FIG. 2 illustrates an exemplary peer relationship between CPs and a RP in a VLAN bridged network. From FIG. 2, one can see that data frames flow from a source end host 202 to a destination end host 204 via switches 206 and 208. If congestion is detected at destination end host 204 (i.e., end host 204 is a CP), or any of the switches, CNMs will be sent back to source end host 202. In FIG. 2, the dashed line denotes the CP-RP peer relationship, and the arrows demonstrate the flow directions of data frames and CNMs.

However, if the VLAN shown in FIG. 2 is a private VLAN, a CNM generated by a switch may not be able to reach the source of a sampled frame. For example, assume that end host 202 is coupled to switch 206 via an I-port 207, and switch 208 is coupled to switch 206 via a T-port 209. If switch 208 is congested and samples a frame received from end host 202, it will generate a CNM that carries the same isolated VLAN ID associated with I-port 207 (unless it is configured for the correct primary VLAN). However, switch 206 is prohibited from forwarding this CNM frame to end host 202 via I-port 207, based on the egress VLAN filtering rule associated with I-port 207, EVF={P}. (Note that we use the notation {v1, v2, v3} for the EVF at a port, where v1, v2, and v3 denote the set of VLANs whose frames are allowed to be forwarded out of that port.) Consequently, the CNM frame cannot reach end host 202.

One solution for such a problem requires is to allow a congested switch (such as switch 208) to generate a CNM with a primary VLAN ID (which is specified in the standard). However, this solution requires the switch to be aware of the private VLAN configuration and maintain a mapping between the secondary VLAN IDs and the primary VLAN ID. That is, the switch needs to determine what the proper primary VLAN ID is based on the isolated VLAN ID of a sampled frame. This way, when a sampled frame is received from a isolated secondary VLAN, the switch can map the isolated VLAN ID to the proper primary VLAN ID, and generate a CNM frame that can be forwarded to the end host coupled to an I-port.

Nonetheless, the above approach has its drawbacks because it requires a core switch in the network to be aware of the private VLAN configurations, even if they do not need to maintain such information. For example, in FIG. 1, core switch 102 only has two T-ports coupled to switches 104 and 106, thus having no need to know the configuration of network 100. However, if switch 102 needs to generate a CNM using the primary VLAN ID, switch 102 needs to know the configurations of the private VLANs (i.e., which VLAN IDs are isolated VLAN IDs and which VLAN ID is the corresponding primary VLAN ID). As the network scales up to include multiple VLAN tags as with provider bridges and provider backbone bridges, the mapping information can become overwhelming. For example, in a multi-tenant environment, the service provider can set up its own VLAN using a service tag (S-tag), and each individual customer can set up his own VLAN using a customer tag (C-tag). In such a scenario, to generate a CNM using the primary VLAN ID, a provider bridge needs to know the mapping of individual C-tags to primary VLAN IDs, even though the switch is only concerned with forwarding based on the S-tags and not the C-tags.

To overcome such drawbacks, in embodiments of the present invention, the egress filtering rule associated with an I-port is relaxed and egress access control lists (eACLs) are used to enforce forwarding restrictions. As discussed in the previous section, in a conventional private VLAN, the IVF and the EVF rules for an I-port are expressed as IVF={I} and EVF={P}, respectively. Such configuration prevents any traffic other than frames with the primary VLAN ID from going out of an I-port. To ensure that a CNM for a sampled frame received on an I-port can go out of an I-port, in embodiments of the present invention, the EVF rule for I-ports is modified as EVF={P,I}, which means that an I-port is allowed to forward frames with either primary VLAN IDs or isolated VLAN IDs. This modification allows CNM frames with isolated VLAN IDs to reach their source.

However, such a modification presents a security risk by allowing two hosts coupled to I-ports to communicate with each other. To ensure that no other traffic but the CNM frames can go out of an I-port, in one embodiment, a switch restricts such forwarding to only CNM frames by using an eACL.

An ACL is a sequential collection of permit and deny conditions that apply to frames crossing specified interfaces or VLANs. When a frame is received on an interface (ingress ACLs) or a frame is about to be forwarded via an interface (egress ACLs), the switch compares the fields in the packet against any applied ACLs to verify that the frame has the required permissions to be accepted from the interface (in the case of ingress ACLs) or forwarded to the interface (in the case of egress ACLs), based on the criteria specified in the ACLs. During operation, the switch tests a received frame against the conditions specified by an ACL, and the first matched condition decides whether the switch accepts or rejects the frame. Because the switch stops testing after the first match, the order of conditions in the ACL is critical. If no match is found, the switch rejects the frame. If there are no restrictions, the switch accepts (ingress ACL) or forwards (egress ACL) the frame. To ensure that no isolated VLAN (I-VLAN) traffic other than CNM frames can go out of an I-port, in one embodiment, the eACL for the I-ports is configured as following (assuming that the operation is based on the outgoing port, the Ethertype in the frame, and the VLAN ID in the frame):

port number, CNM etype, I-VLAN→permit;
port number, *, I-VLAN→deny.

Note that the first condition in the eACL states that if the received frame has a isolated VLAN ID and its Ethertype field indicates that it is a CNM, then the port permits the frame to be forwarded via an I-port. The second condition in the eACL states that if the received frame has an isolated VLAN ID, then the port rejects the frame (i.e., prevents the frame from egressing). Consequently, this eACL effectively allows CNM frames with isolated VLAN IDs to go out of the I-port while blocking other non-CNM I-VLAN traffic.

Figure 3:
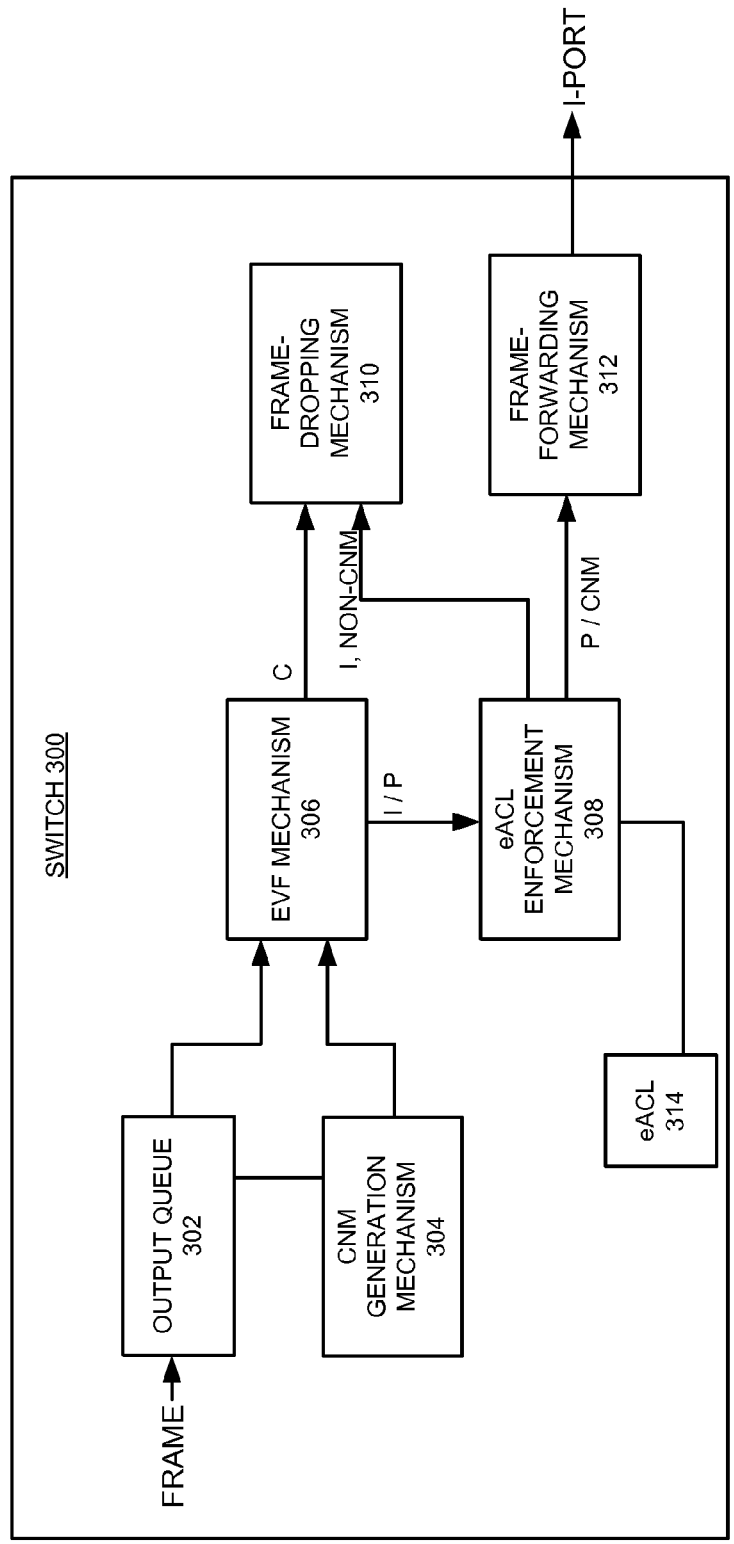
FIG. 3 presents a diagram illustrating the architecture of a switch in a private VLAN implementing a congestion notification mechanism, in accordance with an embodiment of the present invention.

FIG. 3 presents a diagram illustrating the architecture of a switch in a private VLAN implementing congestion notification mechanism, in accordance with an embodiment of the present invention. Switch 300 includes an output queue 302 for temporarily storing egressing frames which originated from an I-port, a CNM generation mechanism 304, an egress VLAN filtering (EVF) mechanism 306, an eACL enforcement mechanism 308, a frame-dropping mechanism 310, and a frame-forwarding mechanism 312. During operation, output queue 302 receives an egress frame to be forwarded from one of the switch ports. CNM generation mechanism 304 monitors the status of output queue 302. When a congestion is detected (e.g., the size of output queue 302 exceeds a predetermined threshold), CNM generation mechanism 304 samples the congested queue 302 and generates a CNM frame based on the sampled frame. Alternatively, switch 300 may receive a CNM frame generated by another switch, in which case the above steps are not performed inside this switch.

The CNM frame or a frame retrieved from the head of output queue 302 is then sent to EVF mechanism 306, which applies the EVF rules (including the modified I-port EVF rule, EVF={P, I}) based on the frame's VLAN ID. If the frame has a community VLAN ID, it is dropped by mechanism 310. If the frame has a primary VLAN ID or isolated VLAN ID, it is forwarded to eACL enforcement mechanism 308. eACL enforcement mechanism 308 applies eACL 314, and determines whether the frame should be rejected. If the frame has an isolated VLAN ID and is a CNM frame, or if the frame has a primary VLAND ID, it is forwarded to the I-port by mechanism 312. Otherwise, the frame is dropped.

Figure 4:
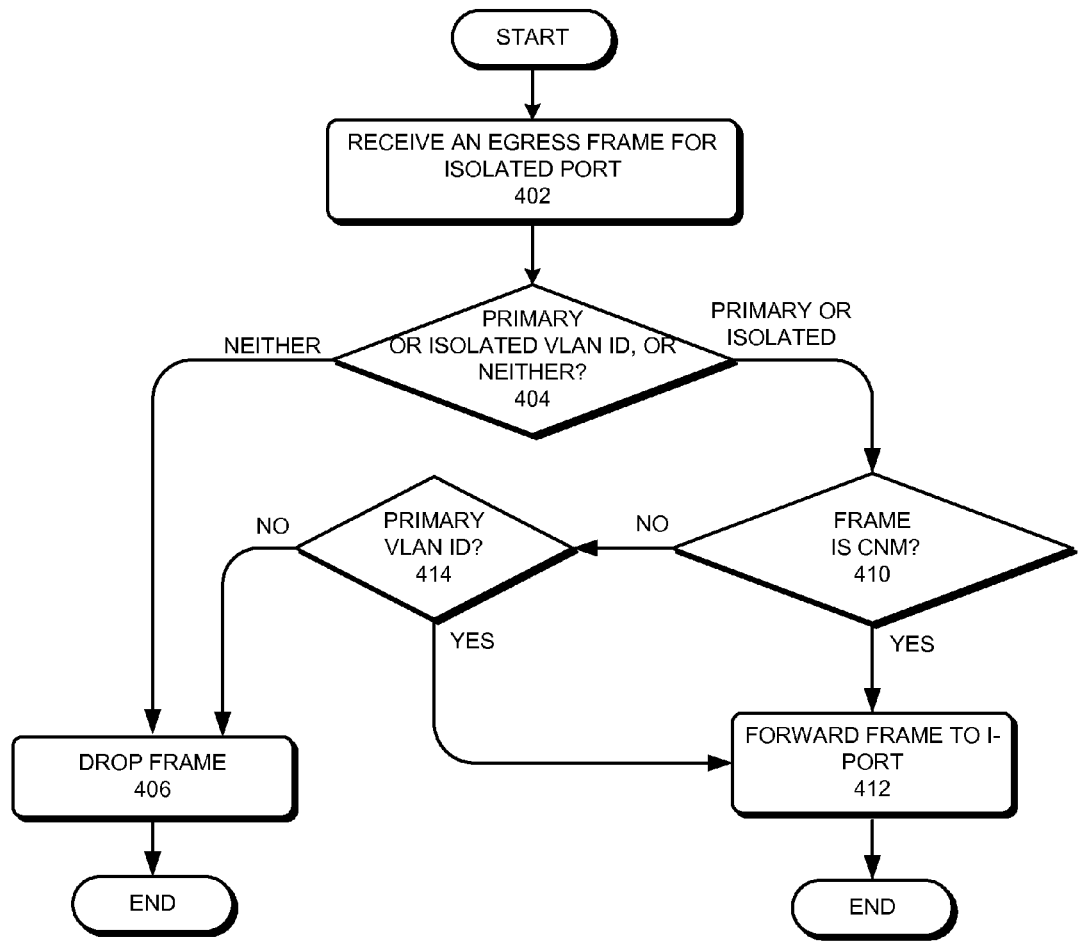
FIG. 4 presents a flowchart illustrating the process of egress frame filtering at an isolated port, in accordance with an embodiment of the present invention.

FIG. 4 presents a flowchart illustrating the process of egress frame filtering at an isolated port, in accordance with an embodiment of the present invention. During operation, the output module of an I-port on a switch receives an egressing frame (operation 402). The switch then determines whether the frame has an isolated or primary VLAN ID, or neither (operation 404). If the frame has neither a primary or isolated VLAN ID, the switch drops the frame (operation 406). If the frame has a primary or isolated VLAN ID, the switch determines whether the frame is a CNM (operation 410). If so, the frame is forwarded to the I-port (operation 412). Otherwise, the switch further determines whether the frame has a primary VLAN ID (operation 414). If so, the frame is forwarded to the I-port (operation 412). Otherwise, the frame is dropped (operation 406).

The data structures and code described in this disclosure can be partially or fully stored on a non-transitory computer-readable storage medium and/or a hardware module and/or a hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other non-transitory media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed. Specifically, the methods and/or processes may be described in a hardware description language (HDL) which may be compiled to synthesize register transfer logic (RTL) circuitry which can perform the methods and/or processes.

The methods and processes described in this disclosure can be partially or fully embodied as code and/or data stored in a computer-readable storage medium or device, so that when a computer system reads and/or executes the code and/or data, the computer system performs the associated methods and processes. The methods and processes can also be partially or fully embodied in hardware modules or apparatuses, so that when the hardware modules or apparatuses are activated, they perform the associated methods and processes. Further, the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A switch, comprising:
    a processor;
    a computer-readable storage medium storing instructions which when executed by the processor causes the processor to perform a method, the method comprising:
        allowing a frame with an isolated virtual local area network (VLAN) identifier to be forwarded via an isolated VLAN port; and
        enforcing an egress VLAN filtering rule for the isolated VLAN port.

2. The switch of claim 1, wherein the egress VLAN filtering rule permits forwarding of frames with an isolated VLAN identifier or primary VLAN identifier.

3. The switch of claim 1, wherein the method further comprises enforcing an egress access control list.

4. The switch of claim 1, wherein the method further comprises preventing a frame with an isolated VLAN identifier and which is not a congestion notification frame from being forwarded via the isolated VLAN port.

5. The switch of claim 3, wherein the method further comprises examining an Ethertype field in the frame's header to determine whether the frame is a congestion notification message.

6. The switch of claim 1, wherein the switch is an Ethernet switch.

7. A computer executable method, comprising:
    allowing a frame with an isolated virtual local area network (VLAN) identifier to be forwarded via an isolated VLAN port; enforcing an egress VLAN filtering rule for the isolated VLAN port.

8. The method of claim 7, wherein the egress VLAN filtering rule permits forwarding of frames with an isolated VLAN identifier or primary VLAN identifier.

9. The method of claim 7, further comprising enforcing an egress access control list.

10. The method of claim 9, wherein enforcing the egress access control list comprises preventing a frame with an isolated VLAN identifier and which is not a congestion notification frame from being forwarded via the isolated VLAN port.

11. The method of claim 9, wherein enforcing the egress access control list comprises examining an Ethertype field in the frame's header to determine whether the frame is a congestion notification message.

12. The method of claim 7, wherein the frame is an Ethernet frame.

13. A non-transitory computer-readable storage medium storing instructions which when executed by a computer cause the computer to perform a method, the method comprising:
    allowing a frame with an isolated virtual local area network (VLAN) identifier to be forwarded via an isolated VLAN port; and
    enforcing an egress VLAN filtering rule for the isolated VLAN port.

14. The non-transitory computer-readable storage medium of claim 13, wherein the method further comprises enforcing an egress access control list.

15. The non-transitory computer-readable storage medium of claim 14, wherein enforcing the egress access control list comprises preventing a frame with an isolated VLAN identifier and which is not a congestion notification frame from being forwarded via the isolated VLAN port.

16. The non-transitory computer-readable storage medium of claim 14, wherein enforcing the egress access control list comprises examining an Ethertype field in the frame's header to determine whether the frame is a congestion notification message.

17. The non-transitory computer-readable storage medium of claim 13, wherein the frame is an Ethernet frame.

18. The non-transitory computer-readable storage medium of claim 13, wherein the egress VLAN filtering rule permits forwarding of frames with an isolated VLAN identifier or primary VLAN identifier.

19. A switch means, comprising:
   a forwarding means for allowing a frame with an isolated virtual local area network (VLAN) identifier to be forwarded via an isolated VLAN port; and
   an enforcing means for enforcing an egress VLAN filtering rule for the isolated VLAN port.

\* \* \* \* \*